United States Patent [19]
Hershelman

[11] Patent Number: 5,149,468
[45] Date of Patent: Sep. 22, 1992

[54] METHOD FOR PRODUCING FILTER MATERIAL FORMED OF MELT-BLOWN NON-WOVEN MAT SANDWICHING ADDITIONAL MATERIAL

[75] Inventor: James W. Hershelman, Alhambra, Calif.

[73] Assignee: Moldex/Metric Products, Inc., Culver City, Calif.

[21] Appl. No.: 438,701

[22] Filed: Nov. 17, 1989

[51] Int. Cl.$^5$ .............................................. D04H 5/00
[52] U.S. Cl. ...................................... 264/12; 264/518; 264/555; 264/112; 264/113; 264/121; 156/167
[58] Field of Search ................ 264/12, 517, 518, 121, 264/112, 113, 122, 555; 156/167

[56] References Cited

U.S. PATENT DOCUMENTS

| | | |
|---|---|---|
| 3,337,669 | 8/1967 | Shannon et al. ............... 264/121 |
| 3,544,414 | 12/1970 | Simison ............................ 264/121 |
| 3,849,241 | 11/1974 | Buntin et al. .................... 156/167 |
| 4,380,570 | 4/1983 | Schwarz ........................... 264/12 |

Primary Examiner—Hubert C. Lorin
Attorney, Agent, or Firm—Charles H. Schwartz; Ellsworth R. Roston

[57] ABSTRACT

A method for producing a melt-blown non-woven mat wherein a fiber-forming thermoplastic polymer resin is extruded in molten form through a row of nozzles into a stream of hot gas which attenuates the molten resin into fibers that form a fiber stream. The fibers are collected on a receiver in the path of the fiber stream to form the non-woven mat. At least two spaced rows of nozzles are provided to produce first and second fiber streams spaced from each other. The spaced fiber streams are collected on the receiver to form a first non-woven mat portion and a second non-woven mat portion and with the first non-woven mat portion overlaying the second non-woven mat portion. At a position intermediate the first and second fiber streams, material different than the fiber-forming resin is injected to have the different material captured between the first and second fiber streams and thereby form a collected structure of the first and second mat portions sandwiching the different material.

6 Claims, 1 Drawing Sheet

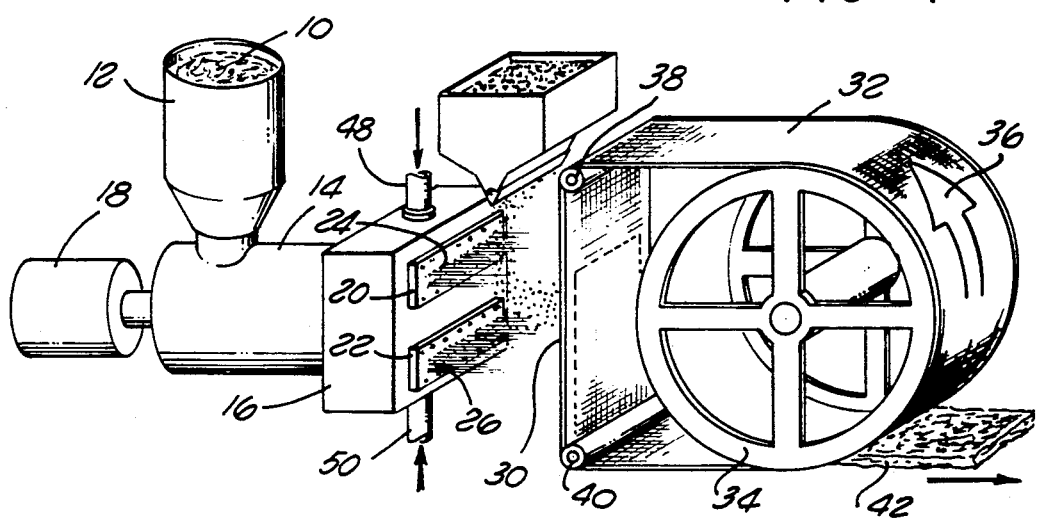
FIG 1
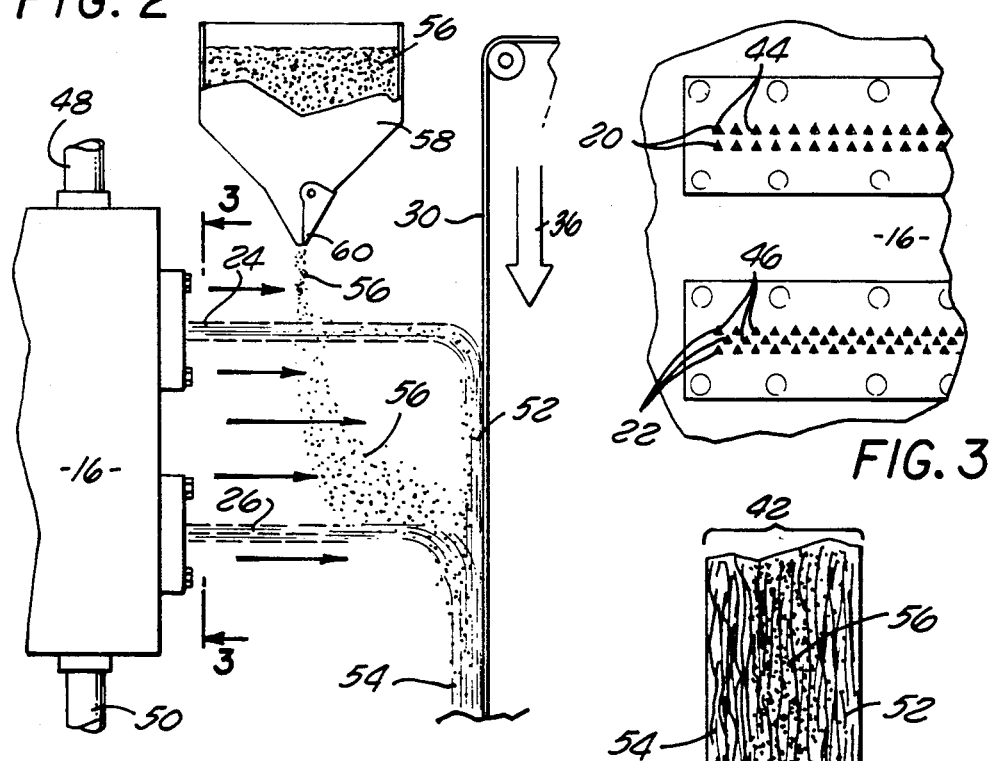
FIG. 2
FIG. 3
FIG. 4 though assembly of the two streams are described above have been used to provide for many different applications. One such application is filtering of various types. Specifically, the non-woven mats may be formed into flat filters which can be used to filter either gases or liquids. Also, the non-woven mats may be formed into various shapes such as filter masks used to provide for individual filtering by the user of the face mask. In any event, it is often desired to improve the characteristics of the non-woven mat such as the filtering capability by either using additional layers of the non-woven mat or by incorporating additional material different than the non-woven mat. One example would be the use of activated charcoal within the filter structure.

5,149,468

METHOD FOR PRODUCING FILTER MATERIAL FORMED OF MELT-BLOWN NON-WOVEN MAT SANDWICHING ADDITIONAL MATERIAL

BACKGROUND OF THE INVENTION

The present invention relates to melt blowing processes for producing non-woven mats. More specifically, the present invention relates to an apparatus and method for producing non-woven mats which form a sandwich of non-woven material having an intermediate layer of material different than the non-woven material.

In general, melt blowing processes are those in which a thermoplastic resin is extruded in molten form through orifices of heated nozzles into a stream of hot gas to attenuate the molten resin gas fibers, the fibers being collected on a receiver in the path of the fiber stream to form a non-woven or spun bonded mat. Various melt blowing processes have been described before, including those shown in the Buntin et al U.S. Pat. No. 3,849,241 and the Schwarz U.S. Pat. No. 4,380,570. In addition to these two patents, other efforts are described in other patents and publication, many of which are referred to in the Buntin et al patent.

Basically, the processes fall into two general classes, one of which is shown in the Buntin et al patent and the other in the Schwarz patent. In the Buntin patent, the stream of hot gas passes through elongated slots which are located on either side of a row of nozzles and with the elongated slots providing the stream of hot gas for all of the nozzles. In the Schwarz et al patent, each nozzle is individually surrounded by openings to provide for an individual stream of gas for each nozzle. The present invention, however, can operate with either of the systems, but it is preferred that the invention operate with the type of system shown in the Schwarz patent as will become apparent with a further description of the present invention.

The non-woven mats produced by the melt blowing processes described above have been used to provide for many different applications. One such application is filtering of various types. Specifically, the non-woven mats may be formed into flat filters which can be used to filter either gases or liquids. Also, the non-woven mats may be formed into various shapes such as filter masks used to provide for individual filtering by the user of the face mask. In any event, it is often desired to improve the characteristics of the non-woven mat such as the filtering capability by either using additional layers of the non-woven mat or by incorporating additional material different than the non-woven mat. One example would be the use of activated charcoal within the filter structure.

In the past, activated charcoal may be placed between two separate layers of non-woven material and with the edges sealed to capture the charcoal material within the layers of non-woven material. In order to provide for such a structure, the individual mats of non-woven material must be produced separately and with a completely separate operation provided in which one layer is positioned to receive a layer of activated charcoal and then a second layer of non-woven material placed over the layer of activated charcoal to provide for the sandwich structure of the two layers of non-woven material capturing the activated charcoal. It would be appreciated that such a method is cumbersome and is expensive.

SUMMARY OF THE INVENTION

The present invention is directed to an apparatus and method for producing a non-woven mat such as filter material incorporating layers of non-woven material capturing a layer of material different than the non-woven material, and with the sandwich structure produced in a single unitary step. In particular, the present invention provides for a melt blowing process wherein at least a pair of streams of fiber forming thermoplastic polymer resin is extruded in molten form to orifices of heated nozzles into streams of hot gas. This attenuates the molten resin fibers to form individual fiber streams and with the individual fiber streams collected on a receiver in the path of the fiber streams to form a non-woven mat of separate mat portions.

The two streams of non-woven material extend horizontally to be deposited on a receiver surface which is vertical. The two separate streams, therefore, extend outward and with the uppermost of the fiber streams first hitting the vertical surface of the receiver and being deposited on the receiver to produce a first non-woven mat portion. The receiver surface moves vertically downward and as it moves downward, the lower stream of non-woven material is collected as a second non-woven mat portion on top of the already deposited first non-woven mat portion. In this way, a dual layer structure is produced at the same time.

In addition to the above, material different than the non-woven material, such as fine particles of activated charcoal are injected between the two streams of non-woven material to be collected first on the first deposited non-woven mat portion and then to be covered by the second non-woven mat portion. This process thereby produces an automatic sandwiching of the different material, such as activated charcoal, inbetween and sandwiched by the two portions of non-woven material.

In order to provide for the injection of the different material such as filter material, a simple technique is used of allowing the different material to free fall from a hopper. In this way the different material passes through the first stream of non-woven material while the fibers are separated and still primarily in a molten state. In this way the different material is deposited between the two fiber streams as the two layer structure is being produced.

As will become more apparent, the preferred melt blowing process to be used is that shown in the Schwarz patent, since this patent has individual streams of hot gas to thereby allow a greater percentage of the different material to free fall through these individual gas streams. However, a similar system could be used with the process of the Buntin et al patent, but with the Buntin et al process it would be preferable to inject the different material using structure located inbetween the two fiber streams, or using structure located outside the ends of the two fiber streams. However, as indicated above the preferred embodiment uses an extremely simple system of having the different material merely free fall from a hopper to pass through the upper stream to be captured between the two streams of non-woven material.

BRIEF DESCRIPTION OF THE DRAWINGS

A clearer understanding of the present invention will be had with reference to the following description and drawings wherein.

FIG. 1 is a schematic view of the overall system of the present invention;

FIG. 2 is a detailed side view illustrating the free falling of the different material between the streams of fibers;

FIG. 3 is front view illustrating the spaced nozzle arrangement and illustrating different nozzle configurations; and FIG. 4 is a cross sectional view of a sandwich material produced in accordance with the teaching of the present invention.

DETAILED DESCRIPTION OF THE INVENTION

As shown in FIG. 1, a fiber forming thermoplastic polymer resin 10, which may be formed as pellets, is introduced into a hopper 12 of an extruder 14. The resin used in the present invention would normally be either thermally degraded before being introduced into the extruder 14, or is thermally degraded in the extruder 14 and/or is thermally degraded in a die head 16. Normally, the resin is added into the hopper 12 and is then heated in the extruder 14 at an elevated temperature. The proper temperature to provide for the degree of thermodegradation necessary would vary depending upon the resin that is used. Further, the degree of thermodegradation will depend on the resin flow rates used in the melt blowing process.

The fiber forming resin is forced through the extruder 14 by a drive apparatus 18 which moves the fiber forming resin into the die head 16. Also, as can be seen in FIG. 3, the die head 16 includes two spaced rows of nozzles 20 and 22 and with each row formed by multiple row portions. The die head 16 normally include heating plates (not shown) which are used in the thermodegradation of the resin before it is melt blown. Therefore, a partial thermodegradation of the resin may be carried out in extruder 14 and a final degradation may be provided in the nozzle die head 16.

The resin is then forced out of orifices in the rows of nozzles 20 and 22 in the nozzle die head 16 as molten strands into a gas stream which attenuates the molten strands into first and second spaced fiber streams 24 and 26. The fiber streams 24 and 26 are collected on a moving collecting surface 30 which collecting surface 30 is formed on a belt member 32 driven by a drum 34 in a direction shown by the arrow 36. The belt 32 passes over a pair of rollers 38 and 40 to form a vertical portion for the belt which serve as the collecting surface 30. The fiber streams 24 and 26, which are collected on the collecting surface 30, form a continuous non-woven mat 42, the details which will be described at a later portion of this specification.

The gas stream which attenuates the extruded molten resin is supplied by a plurality of gas outlet openings which surround each one of the individual nozzles 20 and 22. The particular structure for the nozzles with the individual surrounding gas streams is shown in detail in Schwarz U.S. Pat. No. 4,380,570 and specific references is made to the Schwarz patent for details of construction of the nozzles and the individual surrounding gas streams.

As shown in FIG. 3, the nozzles 20 are shown to be surrounded by openings 44 in a triangular shape so as to provide for the gas streams at three equal positions surrounding the nozzles 20. Similarly, in FIG. 3 the nozzles 22 are also shown to be surrounded by triangular openings 46, again forming three equal open areas surrounding each nozzle to form the gas stream for each individual nozzle.

It is also to be appreciated that the invention also may use the type of gas streams shown in Buntin et al 3,849,241, but as will become apparent in a further description of the present invention, the structure shown in the Schwarz patent is preferable. Also, as shown in FIG. 3, it is seen that the upper group of nozzles 20 are formed in two closely spaced row portions to form the first fiber stream and with the row 20 having the individual row portions arranged one immediately above the other. The lower group of nozzles 22 is formed in three closely spaced row portions to form the second fiber stream and with the intermediate row portion staggered relative to the two outside row portions.

The gas streams provided from the openings 44 and 46, which gas streams are used to attenuate the extruded molten resin, is supplied through gas lines 48 and 50. In particular, a hot inert gas is used so as not to react with the extruded molten resin. The specific temperature for the hot inert gas again will depend on the particular molten resin used and with details of such temperatures described in the Buntin et al and Schwarz patents.

FIG. 2 illustrates in more detail the fiber streams 24 and 26 as the molten material is attenuated into the individual fibers forming the fiber streams 24 and 26 by the streams of hot gas. As can be seen, the upper fiber stream 24 will impact against the collecting surface 30 first and will be carried downward by the collecting surface to form a first mat portion 52. As the first mat portion 52 moves downward, the second and lower fiber stream 26 now overlays the first mat portion 52 to form a second mat portion 54 to thereby produce a layered non-woven mat structure.

The layered non-woven mat structure may itself form a desirable melt blown non-woven mat which can have a variety of useful applications and specifically provide for desirable filtering characteristics. The present invention, however, incorporate a further material different than the non-woven material interspersed and sandwiched between the mat portions 52 and 54 to additionally enhance the desirable characteristics such as the filtering characteristics of the melt blown non-woven mat.

In particular, as shown in FIG. 2, additional filter material 56 is injected at a position intermediate the first and second fiber streams 24 and 26 before the fiber streams form their final sandwich construction. Specifically, the material 56 may be a highly effective filter material such as particles of activated charcoal which are collected and sandwiched between the mat portions 52 and 54 to form a uniform sandwich structure 42. As shown in FIG. 4 having the two mat portions 52 and 54 sandwich the material 56 there between and lock in position the additional material 56. As shown in FIG. 4, the additional material 56 is formed as an additional layer primarily located in a central position intermediate the mat portions 52 and 54.

If the additional material 56 is injected from a position intermediate the fiber streams 24 and 26, this provides for essentially all of the material 56 being formed as an intermediate layer between the mat portions 52 and 54. This type of injection are desirable if the nozzle structures and gas streams would be of the type shown in the Buntin et al patent. However, with the nozzle and gas streams of the type shown in the Schwarz patent, a simpler injecting structure is shown in FIG. 2.

Specifically, as shown in FIG. 2, a hopper 58 is located above the fiber streams 24 and 26 and with the hopper filled with particulate material 56, such as activated charcoal. The material 56 is then shown to free fall from a lower end 60 of the hopper 58 so that the particulate material 56 passes through the upper fiber stream 24 to be captured between the two fiber streams 24 and 26 to form the layer 56 shown in FIG. 4 intermediate the mat portions 52 and 54.

It will be appreciated that with this type of free fall structure some portion of the particulate material will be carried within the fiber stream 24, as shown in FIG. 4, to be disposed within the mat portion 52. However, since the individual nozzles 20 are spaced from each other and since the gas streams formed by the openings 44 are individual to each nozzle 20, a sufficient distance is provided between the nozzles 20 in a horizontal direction to allow a majority portion of the particulate material to fall into the space between the upper and lower fiber streams 24 and 26. This is clearly shown in FIG. 2 where the majority of the particulate material 56 is shown located within the space between the fiber streams 24 and 26. In addition, the force of the fiber streams 24 and 26 and the force of the hot gas will tend to carry the particulate material in the direction toward the collecting surface 30 to again insure that the majority of the particulate material 56 is captured to form the intermediate layer as shown in FIG. 4.

In addition, the use of a staggered nozzle structure for the nozzles 22 may help to insure that the particulate material 56 does not fall through the lower fiber stream. This is not necessary, nor is the use of the three row portions for the lower fiber stream necessary, but this particular configuration may be desirable in individual cases. The present invention would work satisfactorily even if the lower fiber stream is formed by a structure substantially identical to the upper fiber stream because the particulate material 56, are shown in FIG. 2, is carried along towards the collecting surface. The closer to the collecting surface, the more the fiber streams have the individual fibers entangled to form a mat structure which is impervious to the passage of the particulate material.

It can be seen, therefore, that the non-woven mat structure produced by the present invention is a sandwich construction providing for a pair of mat portions 52 and 54 sandwiching additional material. The additional material may be activated charcoal so as to form a filter material. The combined structure provides for superior filtering characteristics in a number of different filtering capacities. For example, the filter material may be very useful to form a respiratory filter mask, or may be useful to filter out impurities in the air in air circulation systems.

Although the invention has been described with reference to a particular embodiment, it is to be appreciated that various adaptations and modifications may be made and the invention is only to be limited by the appended claims.

I claim:

1. In a method for producing a melt-blown non-woven mat wherein a fiber-forming thermoplastic polymer resin is extruded in molten form through a row of individual nozzles each surrounded by an individual stream of hot gas which attenuates the molten resin into fibers that together form a fiber stream, and the fibers are collected on a receiver in the path of the fiber stream to form the non-woven mat, including the following steps providing at least two spaced rows of nozzles to produce first and second fiber streams spaced from each other, collecting the spaced fiber streams on the receiver to form a first non-woven mat portion and a second non-woven mat portion and with the first non-woven mat portion overlaying the second non-woven mat portion, injecting at a position intermediate the first and second fiber streams material different than the fiber-forming resin to have a substantial portion of the different material captured between the first and second fiber streams and thereby form a collected structure of the first and second mat portions sandwiching the substantial portion of the different material, providing the receiver as a substantially vertical surface and providing the spaced fiber streams as upper and lower substantially horizontal streams to be collected on the substantially vertical surface of the receiver, and wherein the injection of the substantial portion of the different material between the substantially horizontal fiber streams is provided by having the different material fall to the position intermediate the spaced fiber streams and wherein the fall of the different material is provided at a portion above both fiber streams to have the substantial portion of the different material pass through the upper fiber stream to the intermediate position.

2. The method of claim 1 wherein at least one of the two spaced rows of nozzles is provided to have at least two row portions, one above the other.

3. The method of claim 1 wherein all of the spaced rows of nozzles are provided to have at least two row portions, one above the other.

4. The method of claim 1 wherein at least one of the two spaced rows of nozzles is provided to have at least two row portions staggered relative to the other.

5. The method of claim 1 wherein the different material is provided as a particulate material.

6. The method of claim 5 wherein the particulate material is a filter material.

* * * * *